US012495969B2

(12) United States Patent
DiBello et al.

(10) Patent No.: US 12,495,969 B2
(45) Date of Patent: Dec. 16, 2025

(54) ACTIVITY, WEAR, AND STABILITY TRACKING DEVICES, SYSTEMS, AND METHODS TRANSMITTING OVER CELLULAR NETWORK

(71) Applicant: Hanger, Inc., Austin, TX (US)

(72) Inventors: Thomas Andrew Sullivan DiBello, Houston, TX (US); Aaron Guerrero Flores, Austin, TX (US); Shane Richard Wurdeman, Sugar Land, TX (US); Bryce W. Billing, Austin, TX (US); Antonio Manuel Dias, Scottsdale, AZ (US)

(73) Assignee: Hanger, Inc., Austin, TX (US)

( * ) Notice: Subject to any disclaimer, the term of this patent is extended or adjusted under 35 U.S.C. 154(b) by 739 days.

(21) Appl. No.: 17/611,330

(22) PCT Filed: May 14, 2020

(86) PCT No.: PCT/US2020/032938
§ 371 (c)(1),
(2) Date: Nov. 15, 2021

(87) PCT Pub. No.: WO2020/232273
PCT Pub. Date: Nov. 19, 2020

(65) Prior Publication Data
US 2022/0192498 A1 Jun. 23, 2022

Related U.S. Application Data

(60) Provisional application No. 62/848,941, filed on May 16, 2019.

(51) Int. Cl.
A61B 5/00 (2006.01)
A61B 5/11 (2006.01)

(52) U.S. Cl.
CPC .......... *A61B 5/0022* (2013.01); *A61B 5/1118* (2013.01); *A61B 5/112* (2013.01);
(Continued)

(58) Field of Classification Search
CPC ... A61B 5/1118; A61B 5/1114; A61B 5/1121; A61B 5/6811; A61B 5/4851; A61F 2250/0096
See application file for complete search history.

(56) References Cited

U.S. PATENT DOCUMENTS 8,956,294 B2   2/2015   Mccombie et al.
9,640,057 B1   5/2017   Ross
(Continued)

OTHER PUBLICATIONS

International Search Report and Written Opinion regarding Appl. No. PCT PCT/US2020/032938, dated Aug. 19, 2020, 15 pps.
(Continued)

Primary Examiner — Mirza F Alam
(74) Attorney, Agent, or Firm — Foley & Lardner LLP

(57) ABSTRACT

A tracking device includes a housing that can be mounted to a patient or a prosthetic device or orthotic device of the patient. The tracking device can include communications circuitry, a position sensor, and processing circuitry. The position sensor is configured to detect position data regarding the patient. The processing circuitry is configured to receive the position data from the position sensor, determine one or more metrics regarding activity of the patient based on the position data, and use the communications circuitry to transmit at least one of the position data or the one or more metrics to a client device via the cellular network.

18 Claims, 5 Drawing Sheets

(52) U.S. Cl.
CPC .......... *A61B 5/4851* (2013.01); *A61B 5/6811* (2013.01); *A61B 5/6812* (2013.01); *A61B 5/746* (2013.01); *A61B 5/7475* (2013.01); *A61B 2560/04* (2013.01)

(56) References Cited

U.S. PATENT DOCUMENTS

| | | | |
|---|---|---|---|
| 2010/0298659 A1* | 11/2010 | McCombie | A61B 5/721 |
| | | | 600/595 |
| 2016/0361014 A1* | 12/2016 | Kane | A61B 5/4851 |
| 2019/0015048 A1 | 1/2019 | Baker | |
| 2020/0229760 A1* | 7/2020 | DeLuke | G01B 7/24 |
| 2021/0127992 A1* | 5/2021 | Gunderson | A61B 5/746 |
| 2023/0022710 A1* | 1/2023 | Aubin | G06F 30/20 |

OTHER PUBLICATIONS

Penrose, "L TE-M is picking up steam" Oct. 4, 2018 (Oct. 4, 2018) [online], [retrieved on Oct. 7-26, 2020). Retrieved from the Internet <URL: http://www.themobileglobe.com/lte-m-is-picking-up-steam> entire document, especially p. 2, para 2.

* cited by examiner

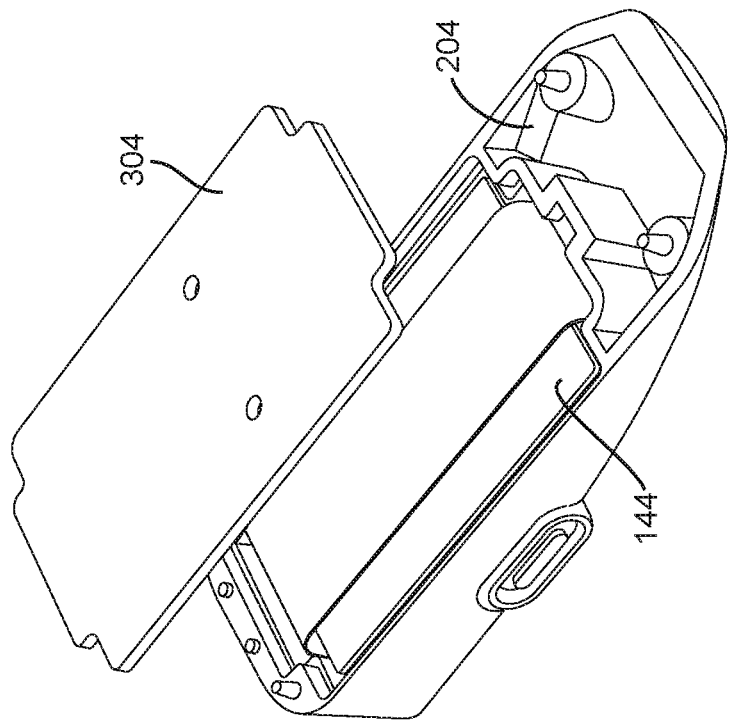
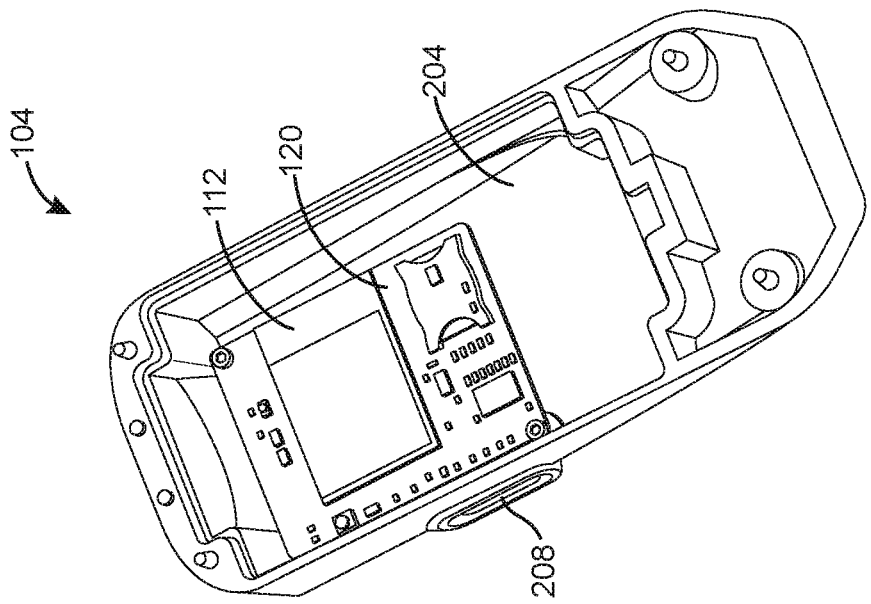

ACTIVITY, WEAR, AND STABILITY TRACKING DEVICES, SYSTEMS, AND METHODS TRANSMITTING OVER CELLULAR NETWORK

CROSS-REFERENCE TO RELATED APPLICATIONS

The present application claims the benefit of and priority to U.S. Provisional Application No. 62/848,941, titled "ACTIVITY, WEAR, AND STABILITY TRACKING DEVICES, SYSTEMS, AND METHODS TRANSMITTING OVER CELLULAR NETWORK," filed May 16, 2019, the entire disclosure of which is incorporated herein by reference.

BACKGROUND

The present disclosure relates generally to wearable monitoring devices. More particularly, the present disclosure relates to activity, wear, and stability tracking devices, systems, and methods transmitting over cellular network.

People with disabilities that require orthotic bracing and those experiencing limb loss, or limb difference that requires prosthetic devices are often at risk of decreased physical activity. This decrease in physical activity can lead to lifelong quality of life issues as well as increased healthcare costs. It can be difficult to effectively monitor physical activity in an accurate manner.

SUMMARY

At least one aspect relates to a tracking device. The tracking device includes a housing, a fastening member configured to mount the housing to at least one of a prosthetic device of a patient, an orthotic device of the patient, or a body of the patient, communications circuitry coupled with the housing, a position sensor coupled with the housing, and processing circuitry coupled with the housing. The communications circuitry is configured to communicate with a cellular network. The position sensor is configured to detect position data regarding the patient. The processing circuitry is configured to receive the position data from the position sensor, determine one or more metrics regarding activity of the patient based on the position data, and transmit at least one of the position data or the one or more metrics to a client device via the cellular network.

In some embodiments, the processing circuitry is configured to transmit the position data to the client device responsive to detecting a particular activity of the patient based on the one or more metrics.

In some embodiments, the position data includes a position and an orientation, and the processing circuitry is configured to apply at least one filter to the position data to modify the position and the orientation relative to the at least one of the prosthetic device, the orthotic device, or the body.

In some embodiments, the tracking device includes an LED light coupled with the housing and a power supply coupled with the housing, and the processing circuitry is configured to use the LED light to indicate at least one of the transmission using the communications circuitry, an operational state, or an energy level of the power supply.

In some embodiments, the processing circuitry is configured to determine whether to transmit the position data to the client device based on at least one of a metric type of the one or more metrics or a value of the one or more metrics.

In some embodiments, the processing circuitry is configured to compare the one or more metrics to at least one corresponding target value and output an alert responsive to the comparison.

In some embodiments, the processing circuitry is configured to adjust a sampling rate of the position sensor by the processing circuitry based on the one or more metrics.

In some embodiments, the processing circuitry is configured to maintain an activity profile regarding the patient.

In some embodiments, the processing circuitry is configured to monitor the communications circuitry to determine whether a network connection with the cellular network is operational, determine that the network connection is not operational at least one first point in time, and responsive to determining that the network connection is not operational at the at least one first point in time, detect at a second point in time that the network connection is operational and in response transmit at least a portion of the at least one of the position data or the metric data using the cellular network.

In some embodiments, wherein the processing circuitry is configured to receive telemetry data regarding the patient from a remote sensor.

In some embodiments, the one or more metrics include at least one of a percentage of time that the tracking device is worn, a percentage of time that the patient is in an active state, a number of steps taken by the patient, a number of stairs climbed by the patient, a number of steps taken by the patient that are running steps, an instable motion, an instable posture, a number of bouts of the patient, an average speed of the patient, an average number of bouts of the patient, a direction, an orientation, a position of the patient, an alignment of the position sensor, a gait of the patient, a battery level of a power supply of the tracking device, or a period of transmission by the communications circuitry. In some embodiments, the one or more metrics include a signal strength of communication using the cellular network.

In some embodiments, the cellular network includes an LTE-M network.

In some embodiments, the tracking device includes a power supply that provides power to the communications circuitry and a kinetic charger that charges the power supply.

In some embodiments, the tracking device includes a user input device recessed from a surface of the housing. The user input device is configured to receive a reset input and cause the processing circuitry to perform a reset operation responsive to the reset input.

At least one aspect relates to a method of operating a tracking device. The method includes detecting, by a position sensor, position data regarding the patient, determining, by one or more processors, one or more metrics regarding activity of the patient based on the position data, and transmitting, by the one or more processors using communications circuitry, at least one of the position data or the one or more metrics to a client device via a cellular network.

In some embodiments, the position data includes a position and an orientation, and the method includes applying at least one filter to the position data to modify the position and the orientation relative to the at least one of the prosthetic device, the orthotic device, or the body.

In some embodiments, the method includes using an LED light to indicate at least one of the transmission using the communications circuitry, an operational state of the tracking device, or an energy level of a power supply of the tracking device.

In some embodiments, the method includes monitoring the communications circuitry to determine whether a network connection with the cellular network is operational, determining that the network connection is not operational at a first point in time, and responsive to determining that the network connection is not operational at the first point in time, detecting at a second point in time that the network connection is operational and in response transmitting at least a portion of the at least one of the position data or the metric data using the cellular network.

At least one aspect relates to a tracking system. The tracking system includes a prosthetic device or an orthotic device, a tracking device, and a client device. The tracking device includes a housing, a fastening member configured to couple the housing with at least one of the prosthetic device, the orthotic device, or a body of the patient, communications circuitry coupled with the housing, a position sensor coupled with the housing, and processing circuitry coupled with the housing. The communications circuitry is configured to communicate with a cellular network. The position sensor is configured to detect position data regarding the patient. The processing circuitry is configured to receive the position data from the position sensor, determine one or more metrics regarding activity of the patient based on the position data, and transmit at least one of the position data or the one or more metrics to the client device via the cellular network. The client device is configured to present an indication of the at least one of the position data or the one or more metrics.

At least one aspect relates to a system. The system includes at least one of an orthotic device or a prosthetic device, a housing coupled with the at least one of the orthotic device or the prosthetic device, a position sensor coupled with the housing, communications circuitry coupled with the housing, and processing circuitry coupled with the housing. The position sensor is configured to detect position data regarding the patient. The processing circuitry is configured to receive the position data from the position sensor, determine one or more metrics regarding activity of the patient based on the position data, and transmit, using the communications circuitry, at least one of the position data or the one or more metrics to a client device via a cellular network.

In some embodiments, the system includes an LED light coupled with the housing and a power supply coupled with the housing, and the processing circuitry is configured to use the LED light to indicate at least one of the transmission using the communications circuitry, an operational state, or a power level of the power supply.

In some embodiments, the position data includes a position and an orientation, and the processing circuitry is configured to apply at least one filter to the position data to modify the position and the orientation relative to the at least one of the prosthetic device, the orthotic device, or the body.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 2 illustrates a perspective view of a portion of a tracking device including mounting of a PCB and antenna in a housing of the tracking device according to an embodiment of the present disclosure.

FIG. 3 illustrates a perspective view of a portion of a tracking device including mounting of a battery in a housing of the tracking device according to an embodiment of the present disclosure.

DETAILED DESCRIPTION

Figure 1:
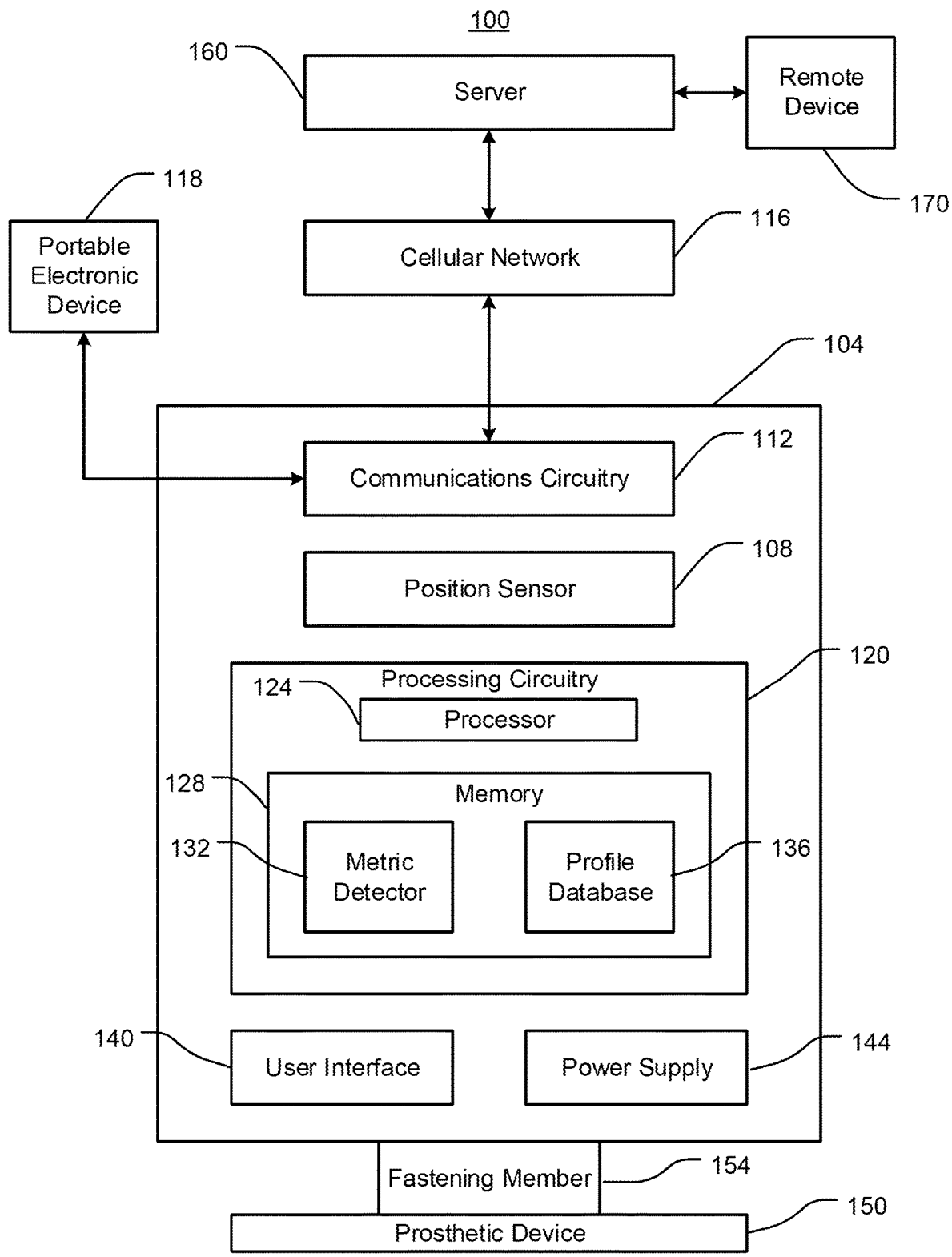
FIG. 1 illustrates a block diagram of a tracking system that can use a tracking device according to an embodiment of the present disclosure.

Devices, systems, and methods in accordance with the present disclosure can facilitate real-time or near-real-time patient activity, wear, and stability tracking with increased accuracy. In some embodiments, a tracking device includes a housing, a fastening member configured to mount the housing with at least one of a prosthetic device of a patient or a body of the patient, communications circuitry coupled with the housing, a position sensor coupled with the housing, and processing circuitry coupled with the housing. The communications circuitry is configured to communicate with a cellular network. The position sensor is configured to detect position data regarding the patient. The processing circuitry is configured to receive the position data from the position sensor, determine one or more metrics regarding activity of the patient based on the position data, and transmit at least one of the position data or the one or more metrics to a client device via the cellular network.

Orthotic bracing and other prosthetic devices may be provided to a patient for a disability that can result in decreased physical activity. The patient's healthcare provider may have very little insight into metrics such as how much a patient is wearing the device, the patient's activity level with the device, or how stable the patient is while using the device. The healthcare provider may rely on information regarding these metrics provided by the patient; however, such information can be inaccurate or otherwise unreliable due to being self-reported.

Some devices, such as step watches, can monitor patient activity, but may need to be brought to the healthcare provider to be read, resulting in large gaps in-between readings. Some devices can use a companion device, such as a cell phone, to receive data from the tracking device and then transmit the data to a client device (e.g., to a device of the healthcare provider) but this relies on the link between the tracker and companion device to remain active and for the patient to have the companion device on them (e.g., in a transmission range of the tracking device) in order for the data to transmit to the client device.

The present solution can enable a tracking device (e.g., tracking device 104 described below) to use a cellular network, such as the LTE-M network, to transmit data regarding a patient's physical activity directly to the cellular network, and in turn other devices connected with the cellular network, without relying on a companion device to act as an intermediary. As such, the present solution can reduce the reliance on potentially inaccurate, self-reported data, and avoid the need for the companion device to always maintain a communication link with the tracking device in order to ensure continuous monitoring and reporting of the physical activity of the patient. The present solution can selectively detect and transmit position data regarding the patient and metrics that are determined based on the position data to reduce power usage by the tracking device while ensuring that critical information is provided in real-time or near-real-time (e.g., within the time used to determine the metrics and communicate the metrics over communication networks) to an electronic device that the healthcare provider can access. The present solution can provide such features while reducing false positives and avoiding a need to identify a type of motion before generating metrics.

Referring now to FIG. 1, a block diagram of a tracking system 100 is illustrated according to an embodiment of the present disclosure. The tracking system 100 can include a tracking device 104, a prosthetic device 150, and a client device 170. The prosthetic device 150 can include any of a variety of orthotic devices or prosthetic devices that can be used for various parts of the body of the patient, such as braces or limb replacement devices.

The tracking device 104 can include a position sensor 108. The position sensor 108 can detect a position of the tracking device 104, and thus detect a position of a patient (e.g., a limb of a patient) or the prosthetic device 150 to which the tracking device 104 is coupled. The position sensor 108 can include an inertial measurement unit. The position sensor 108 can include at least one of a gyroscope, and accelerometer, or a magnetometer (e.g., rather than a GPS receiver). The tracking device 104 can generate and output position data such as position, orientation, angular rate, angular velocity, acceleration, or changes in magnetic fields.

The position sensor 108 can output position data corresponding to movement of at least one of the prosthetic device 150 or the patient wearing the tracking device 104. For example, as the patient performs a movement, the position sensor 108 can output position data corresponding to the movement, such as a series of positions or accelerations as a function of time.

The position sensor 108 can output position data to processing circuitry 120 as described below. In some embodiments, the position sensor 108 outputs the position data on a periodic basis (e.g., every second; every 0.1 seconds). In some embodiments, the position sensor 108 outputs the position data responsive to a request for the position data from the processing circuitry 120.

The tracking device 104 can include communications circuitry 112. The communications circuitry 112 can be configured to receive and transmit data via a cellular network 116, such as the LTE-M network. For example, the communications circuitry 112 can include cellular transceiver and/or cellular modem configured to communicate with the cellular network 116. The communications circuitry 112 can generate and receive transmissions using a Message Queuing Telemetry Transport (MQTT) protocol. The communications circuitry can include a WiFi transceiver for communicating via a wireless communications network. The communications circuitry 112 can communicate via local area networks (e.g., a building LAN), wide area networks (e.g., the Internet, a cellular network), and/or conduct direct communications (e.g., NFC, Bluetooth). The communications circuitry 112 can conduct wired and/or wireless communications. For example, the communications circuitry 112 can include one or more wireless transceivers (e.g., a Wi-Fi transceiver, a Bluetooth transceiver, a NFC transceiver, a cellular transceiver). The communications circuitry 112 can be coupled with at least one antenna 114 that the communications circuitry 112 uses to receive and transmit data over the cellular network 116.

By operating using a cellular network 116, such as the LTE-M network, the tracking device 104 can communicate with the client device 170 without using an intermediary device, such as portable electronic 118. At the same time, the tracking device 104 can provide data to the portable electronic device 118 using the communications circuitry 112, such as by using a Bluetooth or Wi-Fi transceiver of the communications circuitry 112. For example, the portable electronic device 118 can be a portable electronic device or other device that includes a user interface that can be more readily operated than user interface 140 of the tracking device 104.

The tracking device 104 can include processing circuitry 120 including a processor 124 and memory 128. The processor 124 may be implemented as a specific purpose processor, an application specific integrated circuit (ASIC), one or more field programmable gate arrays (FPGAs), a group of processing components, or other suitable electronic processing components. The memory 116 is one or more devices (e.g., RAM, ROM, flash memory, hard disk storage) for storing data and computer code for completing and facilitating the various user or client processes, layers, and modules described in the present disclosure. The memory 128 may be or include volatile memory or non-volatile memory and may include database components, object code components, script components, or any other type of information structure for supporting the various activities and information structures of the inventive concepts disclosed herein. The memory 128 is communicably connected to the processor 124 and includes computer code or instruction modules for executing one or more processes described herein. The memory 128 can include various circuits, software engines, and/or modules that cause the processor 124 to execute the systems and methods described herein.

The processing circuitry 120 can execute a metric detector 132. The metric detector 132 can receive position data from the position sensor 108, including by sampling the position sensor 108 to request the position data. The metric detector 132 can generate metric data by determining one or more metrics regarding the patient based on the position data. For example, the metric detector 132 can apply various functions or filters to the position data to determine the one or more metrics. The metric detector 132 can cause the processing circuitry 120 to maintain a database of position data and determined metrics in memory 128, such as in profile database 136. The metric detector 132 can provide determined metrics to the communications circuitry 112 to cause the communications circuitry 112 to transmit the determined metrics to the client device 170 via the cellular network 116 (or to portable electronic device 118).

The metric detector 132 can detect one or more metrics such as a percentage of time that the tracking device 104 is worn (e.g., percentage worn), a percentage of time that the patient is in an active state (e.g., percentage active), a number of steps taken by the patient (e.g., steps taken), a number of stairs climbed by the patient (e.g., stairs climbed), a number of steps taken by the patient that are running steps (e.g., running steps), instable movement (e.g., steps or other instable posture or motions), a number of bouts of the patient (e.g., bouts, such as periods of walking activity not broken by a predetermined period of inactivity, such as twenty seconds), an average speed of the patient (e.g., average speed), an average number of bouts of the patient (e.g., average bouts), direction, orientation, a position of the patient, such as prone or supine (e.g., prone vs. supine position), an alignment of the tracking device 104 (e.g., device alignment), gait detection and characterization (e.g., optimal gait characterization), remaining battery level or capacity of power supply 144, signal strength of a network connection of communications circuitry 112, sequence of continuous transmissions (a measure of a period of time during which at least one transmission is confirmed to have been transmitted or received, indicating that the tracking device 104 is operational, and thus activity (or the lack thereof) is being monitored, as compared to the patient appearing to be inactive because transmissions are not being received).

The metric detector 132 can detect the one or more metrics for a predetermined period of time, such as on a per-minute, per-hour, per-day, per-week, per-month, or per-year basis, among others. The metric detector 132 can determine a bout as a result of continued detection of stepping (e.g., continued period not broken by inactivity); the bout can have various durations and numbers of steps (e.g., a short bout may have only a few steps whereas a long bout would consistent of a high number of steps). By monitoring bouts, the metric detector 132 can more discretely monitor activity than using steps (e.g., if two patients have performed two thousand steps in a day, but one individual has done this by sitting all day and then doing a single walking bout of two thousand steps, and the other individual has done two hundred bouts through the day of ten steps, of which the latter activity may be more desirable for the patient to perform).

The metric detector 132 can detect the one or more metrics based on instantaneous position data as well as tracking position data over time. For example, the metric detector 132 can determine the percentage of time that the tracking device 104 is worn by monitoring a period of time during which the position data indicates at least a first threshold amount of motion is occurring. The metric detector 132 can determine the percentage of time that the patient is in the active state by monitoring a period of time during which the position data indicates at least a second threshold amount of motion is occurring, which may be greater than the first threshold amount. The metric detector 132 can identify periods of time during which at least one of position, velocity, or acceleration have a variance that is greater than a variance threshold to indicate instable movements. The metric detector 132 can determine and update the variance threshold using historical data regarding the at least one of the position, velocity, or acceleration for the user. The metric detector 132 can determine whether the patient is prone or supine based on detecting an orientation of the tracking device 104 relative to ground (e.g., relative to gravity) as well as a stored indication of the orientation of the tracking device 104 in a known orientation (e.g., the tracking device 104 is known to be upright when the patient is standing). As discussed above, the processing circuitry 120 can monitor transmissions by the communications circuitry 112 (e.g., transmissions that are acknowledged to have been received or to which a response is received) to determine a sequence or duration of time of continuous transmissions; the processing circuitry 120 can store in memory a predetermined amount of metrics determined by the metric detector 132 (e.g., five hours of data).

The metric detector 132 can determine the one or more metrics based on at least one of an orientation of the tracking device 104 or a position of the tracking device 104 relative to the patient (or relative to the prosthetic device 150). This can enable the tracking device 104 to be placed in various positions on the patient, responsive to which the metric detector 132 can adjust how the one or more metrics are determined (e.g., the tracking device 104 can determine the one or more metrics independent of the position and orientation of the tracking device 104). The metric detector 132 can include or execute a plurality of filters (e.g., series of cascaded filters). The metric detector 132 can determine the one or more metrics by receiving position data (e.g., three axis gyroscope and accelerometer signals), and apply at least one filter to the position data, such as a low pass filter to remove a high band of frequency phenomena that can result in inconsistent results. The low pass filter can be applied to each of the position data signals from the gyroscope and the accelerometer. The metric detector 132 can modify the output of the filter into a motion signal (e.g., single motion signal generated by transforming the filtered gyroscope and accelerometer signals, such as by combining orientation indicated by the gyroscope signal and linear acceleration indicated by the accelerometer signal into a single data signal indicative of acceleration in a particular direction), and determine a variance of the motion signal on a periodic basis (e.g., every 100 milliseconds). The metric detector 132 can maintain a dynamic (e.g., rolling) threshold and apply the dynamic threshold to the variance (e.g., as a low pass filter), which can remove an additional frequency band to count a step or stair event based on the variance of the motion signal. The metric detector 132 can update the dynamic threshold based on previous motion data or variance data (e.g., based on a statistic, such as an average, of the motion data or variance data during a predetermined period of time, such as the previous ten seconds).

The processing circuitry 120 can maintain a profile database 136. The profile database 136 can include at least one of historical position data regarding the patient detected by the tracking device 104 or historical metric data regarding the patient detected by the metric detector 132. The profile database 136 can maintain target values regarding particular metrics, such as specific goals related to particular activities. The processing circuitry 120 can monitor the metrics detected by the metric detector 132 and generate alerts regarding whether the metrics meet corresponding target values. For example, the processing circuitry 120 can monitor a number of steps taken by the patient as detected by the metric detector 132, compare the number of steps to a target value for steps, and output a first alert indicating that the number of steps satisfies the target value (e.g., is greater than or greater than or equal to the target value) or a second alert that the number of steps does not satisfy the target value.

The profile database 136 can maintain an activity profile regarding the patient, such as a history of periods during which the metric detector 132 detects that the patient meets a threshold level of activity. The processing circuitry 120 can use the metric data to define a gait classification of the patient. For example, the processing circuitry 120 can detect a gait metric using the metric detector 132, and compare the gait metric to one or more predetermined gait classifications to match the gait metric to a particular gait classification. The processing circuitry 120 can store a gait pattern of the patient in the profile database 136 (e.g., by storing a history of the gait metric as a function of time). The processing circuitry 136 can monitor the gait metric, compare the gait metric to the gait pattern, and detect a deviation of the gait metric relative to the gait pattern based on the comparison, such as by determining that the gait metric deviates from the gait pattern by more than a threshold amount. The processing circuitry 136 can output an alert responsive to detecting the deviation, such as by transmitting the alert to the client device 170 via the cellular network 116.

The processing circuitry 120 can transmit the position data (e.g., raw data) from the position sensor 108 or the metric data determined by the metric detector 132 using the communications circuitry 112. This can enable the processing circuitry 120 to operate in a manner in which different types of readings can be used to send different types of data and trigger different types of processing. For example, the processing circuitry 120 can execute onboard, edge processing of the position data or the metric data before transmitting the processed data to the server 160, where further processing can occur. The processing circuitry 120 can transmit raw data (e.g., raw position data) using the cellular network 116. The processing circuitry 120 can transmit data in real time or near real time (e.g., once per minute, once per hour).

In some embodiments, the processing circuitry 120 transmits at least one of the position data or the metric data based on a transmission condition. The transmission condition can correspond to at least one of a type of the metric data (e.g., which metric is indicated by the metric data) or a value of the metric data. For example, responsive to the type of the metric data being a percentage of time that the tracking device 104 is worn type, the processing circuitry 120 can transmit the metric data and not transmit the raw position data.

In some embodiments, the processing circuitry 120 uses the profile database 136 to store data onboard if the tracking device 104 is outside of cellular signal range, and then upload the stored data when the tracking device 104 returns to an area where it is able to transmit. For example, the processing circuitry 120 can store at least one of the position data or the metric data for at least a predetermined period of time (e.g., most recent hour, day, week, or month of data). The processing circuitry 120 can monitor the communications circuitry 112 to determine whether a network connection with the cellular network 116 is operational, determine that the network connection is not operational at least one first point in time, and responsive to determining that the network connection is not operational at the at least one first point in time, detect at a second point in time that the network connection is operational (e.g., when the communications circuitry 112 reconnects to the cellular network 116) and in response transmit at least a portion of the at least one of the position data or the metric data stored in the profile database 136 using the cellular network 116. As such, the processing circuitry 120 can repeatedly (e.g., more than twice) attempt to connect to a receiving device over the network connection.

In some embodiments, the value of the metric data may indicate a condition of the patient that may require immediate assistance or for which near-real-time evaluation or detailed evaluation may be useful, in which case the processing circuitry 120 can determine to transmit the position data in addition to the metric data. For example, the processing circuitry 120 can compare the metric data determined by the metric detector 132 to a metric threshold corresponding to the type of the metric data, transmit the metric data responsive to the metric data not satisfying the metric threshold, and transmit the position data responsive to the metric satisfying the metric threshold (the metric data may also be transmitted responsive to the metric data satisfying the metric threshold). For example, the processing circuitry 120 can determine that the metric data indicates that the patient has fallen based on the metric data satisfying the metric threshold, and in response, can cause the communications circuitry 112 to transmit the position data used to determine the metric data. The processing circuitry 120 can validate instability metrics, such as by using feedback data indicating whether an instability event occurred and comparing the feedback data to metric data detected by the metric detector 132 regarding instability.

The tracking device 104 can include a user interface 140. The user interface 140 can receive user input and present information regarding operation the tracking device 104. The user interface 140 may include one or more user input devices, such as buttons, dials, sliders, or keys, to receive input from a user. The user interface 140 may include one or more display devices (e.g., OLED, LED, LCD, CRT displays), speakers, tactile feedback devices, or other output devices to provide information to a user. The user interface 140 can include a reset element (e.g., reset button), which can be recessed into the housing 204, such as to prevent inadvertent operation of the reset element; the reset element can receive a user input indicating instructions to reset the processing circuitry 120 and the processing circuitry 120 can perform a reset operation responsive to the user input.

The user interface 140 can include an LED light that the processing circuitry 120 controls to present information regarding operation of the tracking device 104. For example, the LED light can output light to indicate various types of indications, such as that the tracking device 104 is transmitting data, to indicate that the tracking device 104 is in an operational state (e.g., satisfies a self-diagnostic condition), to indicate a state of power supply 144 (e.g., indicate that an energy level of power supply 144 is low, such as by comparing the energy level to a threshold level and outputting the indication responsive to the energy level being less than the threshold level), to indicate that a threshold number of steps have been performed for the day, or to indicate that a network signal strength is low (e.g., less than a threshold network signal strength). The processing circuitry 120 can control parameters of operation of the LED light, such as color, brightness, and intermittency, responsive to a type of indication being presented using the LED light.

The tracking device 104 can include at least one power supply 144. The power supply 144 can be a battery (e.g., lithium ion battery). The tracking device 104 can use the at least one power supply 144 to power operation of components of the tracking device 104, including the processing circuitry 120 and communications circuitry 112. The power supply 144 can be rechargeable, such as by being connected to a remote power source (e.g., mains power; another electronic device). The power supply 144 can be rechargeable using at least one of kinetic motion, inductive charging, or photovoltaic cells. In some embodiments, the processing circuitry 120 controls a mode of operation of the tracking device 104 to reduce a rate of power usage of the power supply 144. For example, the tracking device 104 can operate in a sleep mode when no movement is detected by the metric detector 132 for a predetermined period of time based on position data from the position sensor 108 (e.g., to preserve battery life). The processing circuitry 120 can monitor a life of the power supply 144 (e.g., expected remaining time being charged until discharge).

The tracking device 104 can include a fastening member 154. The fastening member 154 can include at least one of a strap, an adhesive, a fixation element (e.g., screw), velcro, or other components that can be used to fasten the tracking device 104 to the prosthetic device 150, an orthotic device, or the patient. For example, the tracking device 104 can be directly connected to the prosthetic device, or attached to a sound limb through use of the fastening member 154, which can ensure that the activity tracking metrics are related to the patient with the wear of the tracking device 104. Mounting the tracking device 104 to the prosthetic device 150 can enable detection of data regarding the prosthetic device 150 while avoiding need for the prosthetic device 150 to include a user interface to present data.

The processing circuitry 120 can control at least one of a frequency rate of detection or a transmission rate from the tracking device 104 to the server 160 via the cellular network 116 (e.g., to extend battery life). For example, the processing circuitry 120 can cause at least one of the position sensor 108 to detect position data, the metric detector 132 to sample the position sensor 108, or the communications circuitry 112 to transmit metric data or position data at a first rate in a first mode of operation, and at a second rate in a second mode of operation, the second rate greater than the first rate. The processing circuitry 120 can determine to operate in the second mode of operation responsive to detecting a particular transmission condition, such as detecting that the patient has fallen or is undergoing a relatively vigorous movement or period of movement. As such, the processing circuitry 120 can reduce power usage of the power supply 144 while ensuring that information is communicated appropriately to client devices such as the portable electronic device 118, server 160, and client device 170.

The processing circuitry 120 can communicate with other devices to receive telemetry data. For example, the processing circuitry 120 can use the communications circuitry 112 to monitor for data outputted by other devices, such as sensors that may also be worn by the patient or remote from the patient. For example, the processing circuitry 120 can receive telemetry data from a heart rate monitor worn by the patient.

Referring further to FIG. 1, the client device 170 can be used to present information regarding the tracking device 104 and the patient to a remote entity, such as the healthcare provider. The client device 170 can be any type and form of general purpose or special purpose computing device in any form factor, such as a mobile or portable device (phone, tablet, laptop, etc.), or a desktop or personal computing (PC) device. The client device 208 may be used to perform any portion of the operations executed by the processing circuitry 120, such as to detect metrics based on raw position data received from the tracking device 104, or to evaluate metrics (e.g., perform gait classification, gait pattern detection, etc.).

The server 160 can be any type of form of computing device that provides applications, functionality or services to one or more client devices 170 or other devices acting as clients. In some embodiments, the server 160 can be a client device 170. The server 160 can be deployed in a data center or cloud computing environment accessible via one or more networks. The tracking device 104 and/or client device 170 can use and leverage the computing power and resources of the server 160. The tracking device 104 and/or client device 170 can implement any portion of the data processing described with reference to the processing circuitry 120, and in some cases, any portions of the data processing not performed by the tracking device 104 or the client device 170. The server 160 may be used to update the tracking device 104 and/or client device 170 with any updated to the applications, software, executable instructions and/or data on the tracking device 104 and/or client device 170. The tracking device 104 can transmit data using the cellular network 116 to the server 160 so that the server can store the transmitted data, which can then be retrieved by applications executing on the client device 170 (or the portable electronic device 118).

Referring now to FIG. 2, the tracking device 104 is illustrated according to an embodiment of the present disclosure. The tracking device 104 includes a housing 204. The housing 204 can be shaped to receive various components of the tracking device 104, such as processing circuitry 120 and communications circuitry 112. The housing 204 can define an interface 208 to enable a connection with the processing circuitry or other components of the tracking device 104, such as to provide power or communications with the tracking device 104.

Referring now to FIG. 3, the tracking device 104 is illustrated according to an embodiment of the present disclosure. The tracking device 104 includes the power supply 144, which can be received in the housing 204 to be connected with the processing circuitry 120. The tracking device 104 can include a cover 304 to secure the components of the tracking device 104 in the housing 204.

Figure 4:
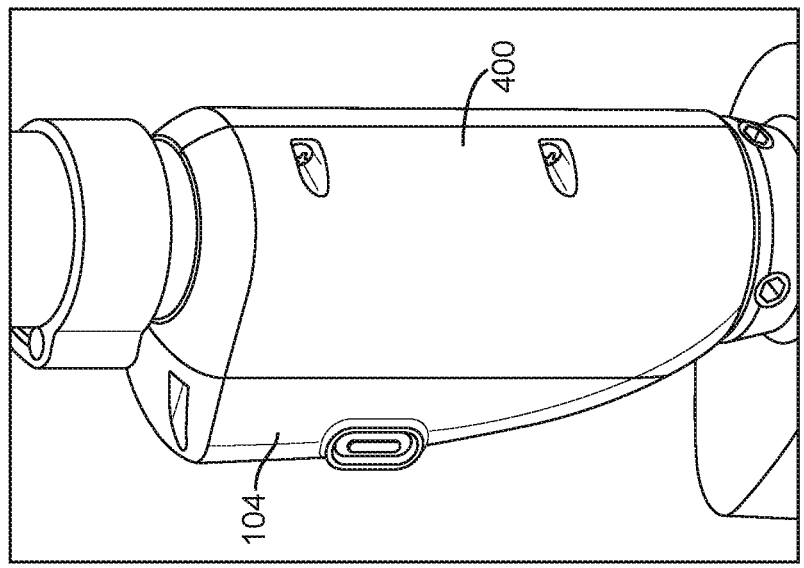
FIG. 4 illustrates a perspective view of mounting of a tracking device to a patient device according to an embodiment of the present disclosure.
Figure 5:
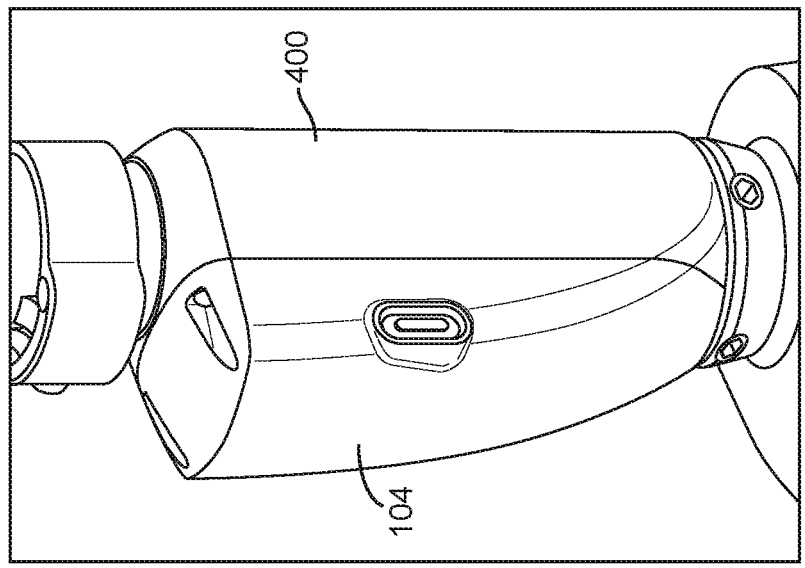
FIG. 5 illustrates a perspective view of mounting of a tracking device to a patient device according to an embodiment of the present disclosure.
Figure 6:
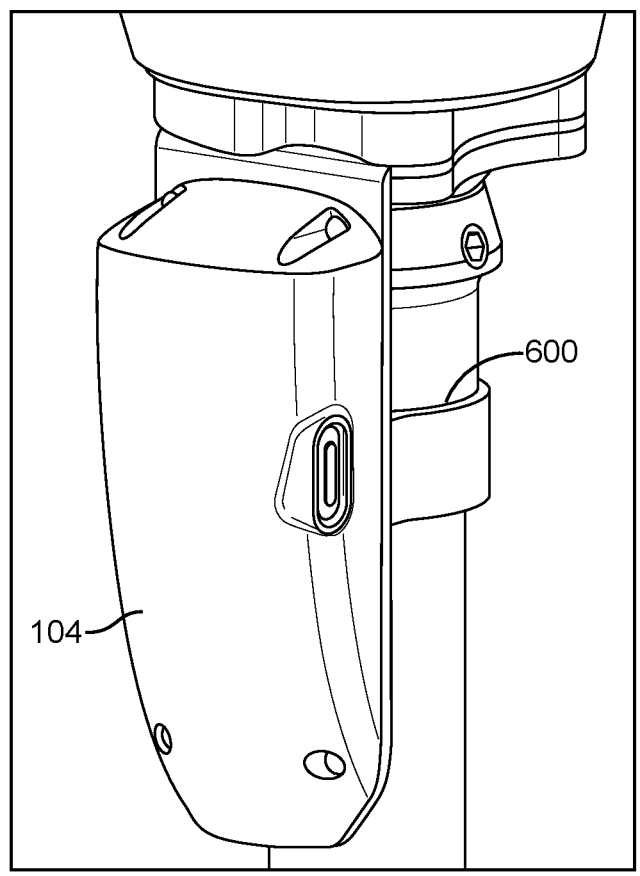
FIG. 6 illustrates a perspective view of mounting of a tracking device to a patient device according to an embodiment of the present disclosure.

Referring now to FIGS. 4-5, the tracking device 104 is illustrated to be coupled with a prosthetic device 400 according to an embodiment of the present disclosure. The prosthetic device 400 can incorporate features of the prosthetic device 150 described with reference to FIG. 1. As shown in FIGS. 4-5, the tracking device 104 can be direct coupled with the prosthetic device 150. Referring now to FIG. 6, the tracking device 104 is illustrated to be coupled with a prosthetic device 600 according to an embodiment of the present disclosure. The prosthetic device 600 can incorporate features of the prosthetic device 150 described with reference to FIG. 1.

Figure 7:
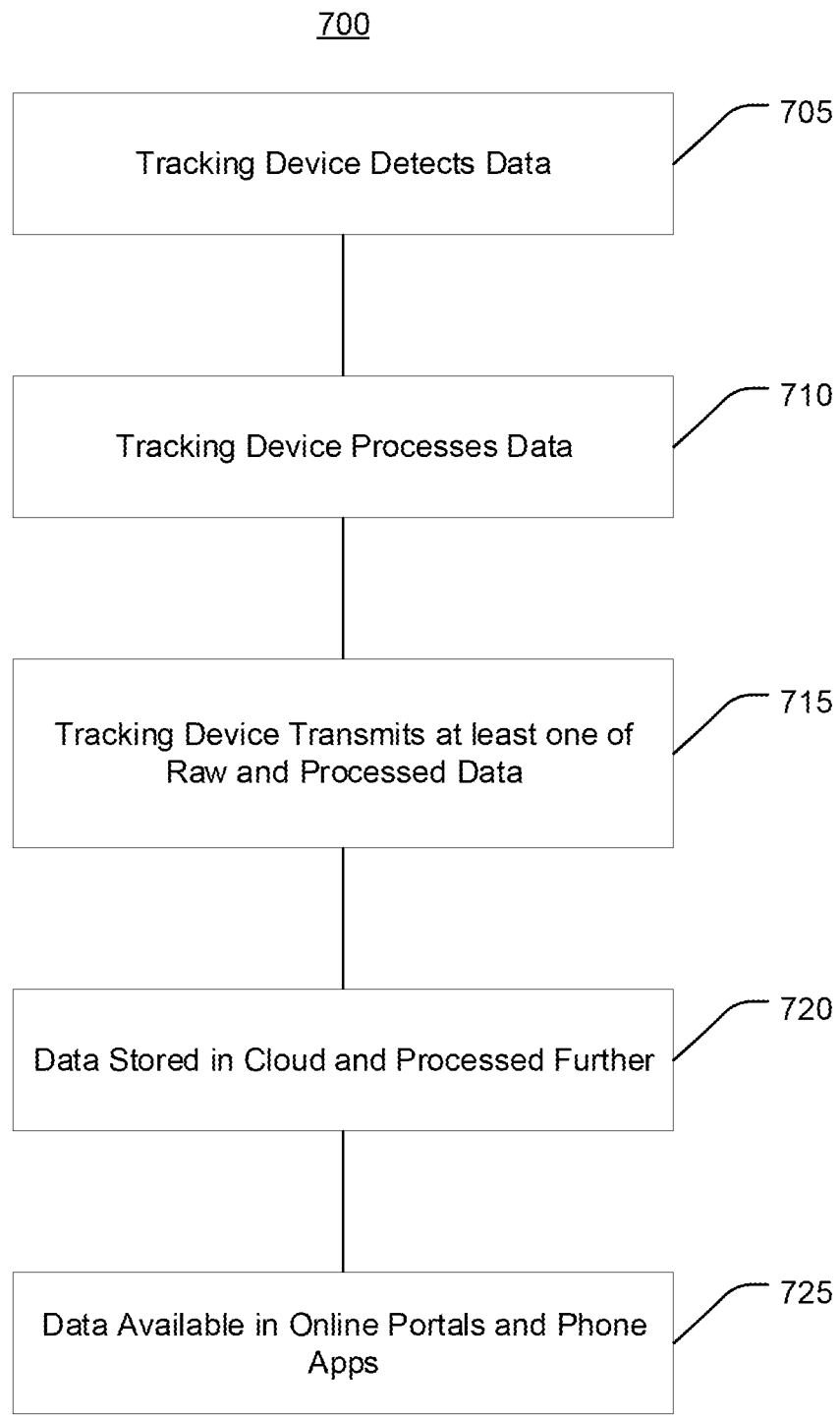
FIG. 7 illustrates a flow diagram of a method of operating a tracking device according to an embodiment of the present disclosure.

Referring now to FIG. 7, a method 700 of operating a tracking device is illustrated according to an embodiment of the present disclosure. The method 700 can be performed using various devices and systems described herein, such as the tracking system 100, tracking device 104, and prosthetic devices 400, 600.

At 705, the tracking device detects position data regarding the patient. The position data can include position, orientation, angular rate, angular velocity, acceleration, or changes in magnetic fields. The tracking device can use various position sensors, such as an inertial measurement unit, gyroscope, accelerometer, or magnetometer to detect the position data.

At 710, the tracking device processes the position data. For example, various functions or filters can be applied to the position data to generate one or more metrics. The one or more metrics can include at least one of a percentage of time that the tracking device is worn, a percentage of time that the patient is in an active state, a number of steps taken by the patient, a number of stairs climbed by the patient, a number of steps taken by the patient that are running steps, a number of steps taken by the patient that are instable, a number of bouts of the patient, an average speed of the patient, an average number of bouts of the patient, a direction, an orientation, a position of the patient, an alignment of the position sensor, or a gait of the patient.

The position data can be processed to generate activity profiles regarding the patient. At 715, the tracking device transmits at least one of raw data (e.g., position data from the position sensor) or processed data to a client device or server. For example, the at least one of the raw data or the processed data can be transmitted to a server that can store the transmitted data. The data can be transmitted via a cellular network.

At 720, the server stores and further processes the data received from the tracking device. For example, the data can be stored in a profile specific to the patient. The data can be processed to generate metrics based on the data, including longitudinal metrics (e.g., based on greater spans of data than the tracking device maintains in memory).

At 725, the server provides information regarding to the patient to one or more interfaces. For example, the server can provide the information to an online portal or an application executing on a portable electronic device (e.g., "app"). A healthcare provider can operate the online portal or application to retrieve the data.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. Further relative parallel, perpendicular, vertical or other positioning or orientation descriptions include variations within +/−10% or +/−10 degrees of pure vertical, parallel or perpendicular positioning. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

What is claimed is:

1. A tracking device, comprising:
 a housing;
 a fastening member configured to mount the housing to at least one of a prosthetic device of a patient, an orthotic device of the patient, or a body of the patient;
 communications circuitry in the housing;
 a position sensor coupled with the housing and configured to detect position data regarding the patient; and
 processing circuitry coupled with the housing and configured to:
  receive the position data from the position sensor;
  determine one or more metrics regarding activity of the patient based on the position data, wherein the one or more metrics include at least one of a percentage of time that the tracking device is worn, a percentage of time that the patient is in an active state, a number of steps taken by the patient, a number of stairs climbed by the patient, a number of steps taken by the patient that are running steps, an instable motion, an instable posture, a number of bouts of the patient, an average speed of the patient, an average number of bouts of the patient, a direction, an orientation, a position of the patient, an alignment of the position sensor, a gait of the patient, a battery level of a power supply of the tracking device, or a period of transmission by the communications circuitry; and
  cause the communications circuitry to transmit at least one of the position data or the one or more metrics to a client device.

2. The tracking device of claim 1, wherein the processing circuitry is configured to transmit the position data to the client device responsive to detecting a particular activity of the patient based on the one or more metrics.

3. The tracking device of claim 1, wherein the position data includes a position and an orientation, and the processing circuitry is configured to apply at least one filter to the position data to modify the position and the orientation relative to the at least one of the prosthetic device, the orthotic device, or the body.

4. The tracking device of claim 1, wherein the processing circuitry is configured to determine whether to transmit the position data to the client device based on at least one of a metric type of the one or more metrics or a value of the one or more metrics.

5. The tracking device of claim 1, wherein the processing circuitry is configured to compare the one or more metrics to at least one corresponding target value and output an alert responsive to the comparison.

6. The tracking device of claim 1, wherein the processing circuitry is configured to adjust a sampling rate of the position sensor by the processing circuitry based on the one or more metrics.

7. The tracking device of claim 1, wherein the processing circuitry is configured to maintain an activity profile regarding the patient.

8. The tracking device of claim 1, wherein the processing circuitry is configured to receive telemetry data regarding the patient from a remote sensor.

9. The tracking device of claim 1, wherein the communications circuitry is configured to transmit the at least one of the position data or the one or more metrics via a cellular network that includes an LTE-M network.

10. The tracking device of claim 1, further comprising:
 a power supply that provides power to the communications circuitry; and
 a kinetic charger that charges the power supply.

11. A method of operating a tracking device, comprising:
 detecting, by a position sensor in a housing, position data regarding a patient;
 determining, by one or more processors in the housing, one or more metrics regarding activity of the patient based on the position data, wherein the one or more metrics include at least one of a percentage of time that the tracking device is worn, a percentage of time that the patient is in an active state, a number of steps taken by the patient, a number of stairs climbed by the patient, a number of steps taken by the patient that are running steps, an instable motion, an instable posture, a number of bouts of the patient, an average speed of the patient, an average number of bouts of the patient, a direction, an orientation, a position of the patient, an alignment of the position sensor, a gait of the patient, a battery level of a power supply of the tracking device, or a period of transmission by communications circuitry of the tracking device; and
 transmitting, by the one or more processors using the communications circuitry, at least one of the position data or the one or more metrics to a client device.

12. The method of claim 11, wherein the position data includes a position and an orientation, the method further comprising applying at least one filter to the position data to modify the position and the orientation relative to the at least one of a prosthetic device coupled with the patient, an orthotic device coupled with the patient, or a body of the patient.

13. A system, comprising:
 at least one of an orthotic device or a prosthetic device;
 a housing coupled with the at least one of the orthotic device or the prosthetic device;
 a position sensor coupled with the housing, the position sensor configured to detect position data regarding a patient;
 communications circuitry in with the housing; and
 processing circuitry coupled with the housing and configured to:
  receive the position data from the position sensor;
  determine one or more metrics regarding activity of the patient based on the position data;
  monitor the communications circuitry to determine whether a network connection with a network is operational;
  determine that the network connection is not operational at at least one first point in time; and
  based on determining that the network connection is not operational at the at least one first point in time, detect at a second point in time that the network connection is operational and based on detection of the network connection being operational at the second point in time, transmit, using the communications circuitry, at least a portion of at least one of the position data or the one or more metrics to a client device via the network connection.

14. The tracking device of claim 1, wherein the processing circuitry is configured to monitor the communications circuitry to determine whether a network connection with a cellular network is operational, determine that the network connection is not operational at at least one first point in time, and responsive to determining that the network connection is not operational at the at least one first point in time, detect at a second point in time that the network connection is operational and in response transmit at least a portion of the at least one of the position data or the metric data using the network connection.

15. The tracking device of claim 1, further comprising a user input device recessed from a surface of the housing and configured to receive a reset input and cause the processing circuitry to perform a reset operation responsive to the reset input.

16. The system of claim 13, further comprising an LED light coupled with the housing and a power supply coupled with the housing, wherein the processing circuitry is configured to use the LED light to indicate at least one of the transmission using the communications circuitry, an operational state, or a power level of the power supply.

17. The tracking device of claim 1, wherein the processing circuitry is configured to transmit at least one of the position data or the one or more metrics at a first rate in a first mode of operation, and at a second rate in a second mode of operation, the second rate greater than the first rate, the processing circuitry configured to determine to operate in the second mode of operation responsive to detecting that the patient has fallen.

18. The tracking device of claim 1, wherein the processing circuitry is configured to detect an instable movement by detecting one or more periods of time during which at least one of position, velocity, or acceleration of the position data have a variance that is greater than a variance threshold.

* * * * *